US009443248B2

(12) United States Patent
Shafi et al.

(10) Patent No.: US 9,443,248 B2
(45) Date of Patent: Sep. 13, 2016

(54) WIRELESS COMMUNICATION-ENABLED PROMOTIONS AND COMMERCIAL TRANSACTIONS

(75) Inventors: Naji Shaheimi Shafi, Seattle, WA (US); Saad B Sami, Redmond, WA (US); Alejandro Steckler, Bellevue, WA (US); Ashwin Raju Jeyakumar, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 263 days.

(21) Appl. No.: 13/349,486

(22) Filed: Jan. 12, 2012

(65) Prior Publication Data

US 2013/0185137 A1    Jul. 18, 2013

(51) Int. Cl.
*G06Q 30/00*    (2012.01)
*G06Q 30/02*    (2012.01)

(52) U.S. Cl.
CPC .......... *G06Q 30/02* (2013.01); *G06Q 30/0207* (2013.01)

(58) Field of Classification Search
CPC .. G06Q 30/02; G06Q 30/0222; G06Q 20/40; H04W 4/206; H04L 67/306
USPC ...................................... 705/44, 64
See application file for complete search history.

(56) References Cited

U.S. PATENT DOCUMENTS

| | | | | |
|---|---|---|---|---|
| 7,801,771 | B1 * | 9/2010 | Sirota ................ | G06Q 20/3672 705/26.1 |
| 7,881,342 | B2 | 2/2011 | Mirmobini et al. | |
| 8,024,225 | B1 * | 9/2011 | Sirota ................... | G06Q 30/06 705/26.1 |
| 2003/0004808 | A1 * | 1/2003 | Elhaoussine ......... | G06Q 20/045 705/14.27 |
| 2004/0054574 | A1 * | 3/2004 | Kaufman ............... | G06Q 30/02 705/14.56 |
| 2004/0083131 | A1 * | 4/2004 | Kaufman ............... | G06Q 30/02 705/14.35 |
| 2005/0096963 | A1 * | 5/2005 | Myr ................. | G06Q 10/06375 705/7.35 |

(Continued)

FOREIGN PATENT DOCUMENTS

| | | |
|---|---|---|
| CN | 101681480 A | 3/2010 |
| KR | 10-2011-0101719 | 9/2011 |
| TW | 201104606 A | 2/2011 |

OTHER PUBLICATIONS

"Angry Birds Magic Hatches at WIMA", Published on: Apr. 19, 2011, Retrieved on: Aug. 25, 2011, Available at: http://conversations.nokia.com/2011/04/19/angry-birds-magic-hatches-at-wima/.

(Continued)

*Primary Examiner* — Gurkanwaljit Singh
(74) *Attorney, Agent, or Firm* — Miia Sula; Judy Yee; Micky Minhas

(57) ABSTRACT

Coupons and other promotions can be enabled using mobile computing devices with Near Field Communication (NFC) or other wireless communication capabilities. For example, a mobile device user can collect a coupon displayed during a cable TV show by tapping his NFC mobile device to a peripheral device in wireless communication with a cable TV receiver. Collected coupons can be stored in a coupon database at the mobile device. Coupons can be redeemed by tapping an NFC mobile device to an NFC point of sale terminal. Coupons can also be collected from advertisements in audio media and web pages, and can be collected at a mobile device from media displayed at the mobile device. Coupons can have time-based, location-based or other usage restrictions. Collecting information stored in NFC tags affixed to items in a scavenger hunt list can unlock downloadable content.

20 Claims, 9 Drawing Sheets

(56) References Cited

U.S. PATENT DOCUMENTS

| | | |
|---|---|---|
| 2006/0178932 A1 | 8/2006 | Lang |
| 2007/0055635 A1* | 3/2007 | Kanapur ............... G06Q 20/04 705/75 |
| 2007/0073589 A1* | 3/2007 | Vergeyle ............... G06Q 30/02 705/14.19 |
| 2007/0203736 A1 | 8/2007 | Ashton |
| 2007/0239546 A1 | 10/2007 | Blum et al. |
| 2008/0109309 A1 | 5/2008 | Landau et al. |
| 2008/0140529 A1 | 6/2008 | Agarwal et al. |
| 2008/0228567 A1* | 9/2008 | Williams ............... G06Q 30/00 705/14.38 |
| 2009/0006197 A1 | 1/2009 | Marcuvitz |
| 2009/0076912 A1* | 3/2009 | Rajan ............... G06Q 30/0267 705/14.64 |
| 2009/0150211 A1* | 6/2009 | Bayne ............... G06Q 30/00 705/14.17 |
| 2009/0150218 A1* | 6/2009 | Brunner ............... G06Q 30/02 705/14.58 |
| 2010/0010964 A1 | 1/2010 | Skowronek et al. |
| 2010/0048226 A1* | 2/2010 | Owen ............... G06Q 30/02 455/466 |
| 2010/0049599 A1* | 2/2010 | Owen ............... G06Q 30/0241 705/14.4 |
| 2010/0094703 A1 | 4/2010 | Bramley et al. |
| 2010/0114683 A1 | 5/2010 | Wessels et al. |
| 2010/0146079 A1 | 6/2010 | Bramley et al. |
| 2010/0241494 A1 | 9/2010 | Kumar et al. |
| 2010/0287103 A1 | 11/2010 | Mason |
| 2011/0015984 A1* | 1/2011 | Galinos ............... G06Q 30/02 705/14.26 |
| 2011/0070829 A1 | 3/2011 | Griffin et al. |
| 2011/0087529 A1* | 4/2011 | Angell ............... G06Q 30/02 705/14.13 |
| 2011/0093318 A1 | 4/2011 | Guday et al. |
| 2011/0182250 A1 | 7/2011 | Shin et al. |
| 2011/0184809 A1 | 7/2011 | Beavers et al. |
| 2011/0302011 A1* | 12/2011 | Yoder ............... G06Q 20/40 705/14.17 |
| 2012/0078697 A1* | 3/2012 | Carlson ............... G06Q 20/40 705/14.23 |
| 2012/0078699 A1* | 3/2012 | Carlson ............... G06Q 20/40 705/14.23 |
| 2012/0221403 A1* | 8/2012 | Brown ............... G06Q 30/02 705/14.35 |
| 2012/0316949 A1 | 12/2012 | Chen |
| 2013/0097006 A1* | 4/2013 | Evans ............... G06Q 20/20 705/14.39 |
| 2013/0097080 A1* | 4/2013 | Smets ............... G06T 1/20 705/44 |

OTHER PUBLICATIONS

"Posts Tagged Coupons", posts dated "Jan. 8th" through "Jul. 25th", Retrieved on: Aug. 25, 2011, Available at: http://www.seofacts.biz/tag/coupons/.

International Search Report dated Apr. 24, 2013, from corresponding International Application No. PCT/US2013/020708, 10 pages.

"Mobile Apps Featuring Pontiflex AppLeads Hit Reach of More Than 115 Million Installs," http://www.marketwire.com/press-release/mobile-apps-featuring-pontiflex-appleads-hit-reach-of-more-than-115-million-installs-1507053.htm, Apr. 27, 2011, 2 pages.

European Communication for EPC Application No. 13736166.3, 1 page, mailed May 18, 2015.

Supplementary European Search Report for EPC Application No. 13736166.3, 1 page, mailed May 18, 2015.

European Communication for EPC Application No. 13736166.3, 2 pages, mailed Jul. 13, 2015.

European Examination Report for EPC Application No. 13736166.3, 4 pages, mailed Jul. 13, 2015.

Office Action and Search Report Issued in Taiwan Patent Application No. 101151039, Mailed Date: Mar. 18, 2016, 11 Pages.

Office Action Issued in China Patent Application No. 201380005320.X, Mailed Date: Jun. 3, 2016, 14 Pages.

* cited by examiner

WIRELESS COMMUNICATION-ENABLED PROMOTIONS AND COMMERCIAL TRANSACTIONS

BACKGROUND

Today, viewing or listening to advertisements on television, radio, or on a computer (perhaps as part of media being streamed from a web-based media provider) is typically a one-way affair. Interaction between a person and a video or audio advertisement usually consists of the person reading, viewing or listening to the advertisement, and nothing more. Often, the primary purpose of video and audio advertisements is to simply make people aware of an offer or promotion. Interaction with an offer or promotion in the form of a print coupon typically involves a person physically clipping and storing coupons for redemption later.

SUMMARY

The tools and techniques described herein allow mobile device users to "clip" coupons mentioned in video or audio media to a mobile device. Clipped coupons are stored at the mobile device until they are redeemed by the user.

In one example, a receiver connected to the cloud can receive media from a media service such as a cable TV provider or a streaming video web site, and display the media at a local media player, such as a television. The media can contain references or mentions to coupons, offers or other promotions. A mobile device user can clip the coupon to his mobile device by tapping the mobile device to a peripheral device that can communicate with the receiver. In response to receiving notification of the mobile device tap to the peripheral, the receiver delivers coupon information to the mobile device via the peripheral. A user can redeem a coupon stored at a mobile device by transferring coupon information to a point of sale terminal when making a purchase. Communication between the mobile device and the peripheral or the mobile device and the point of sale terminal can be performed with Near Field Communication (NFC) or other wireless communication technology.

In another example, the media is received at the mobile computing device, and a coupon is collected by a user tapping a coupon notice in the mobile device display.

Usage restrictions can be attached to the coupons. These usage restrictions can be location-based (for example, the coupon must be redeemed at a place of business within a specified geographic area), time-based (for example, the coupon must be redeemed within a specified amount of time after the coupon is collected by the mobile device), or goods and services-based (for example, the coupon can only be used to purchase school supplies). Usage restrictions can also be applied to financial and other accounts stored at the mobile computing device.

In yet another example, NFC-enabled devices can be used for scavenger hunt promotions in which a user collects information stored in NFC tags (such as RFID tags) affixed to items in a scavenger hunt list. Once information for all of the items in the list is collected, the user can receive a coupon, free downloadable content or other benefit.

DETAILED DESCRIPTION

Figure 1:
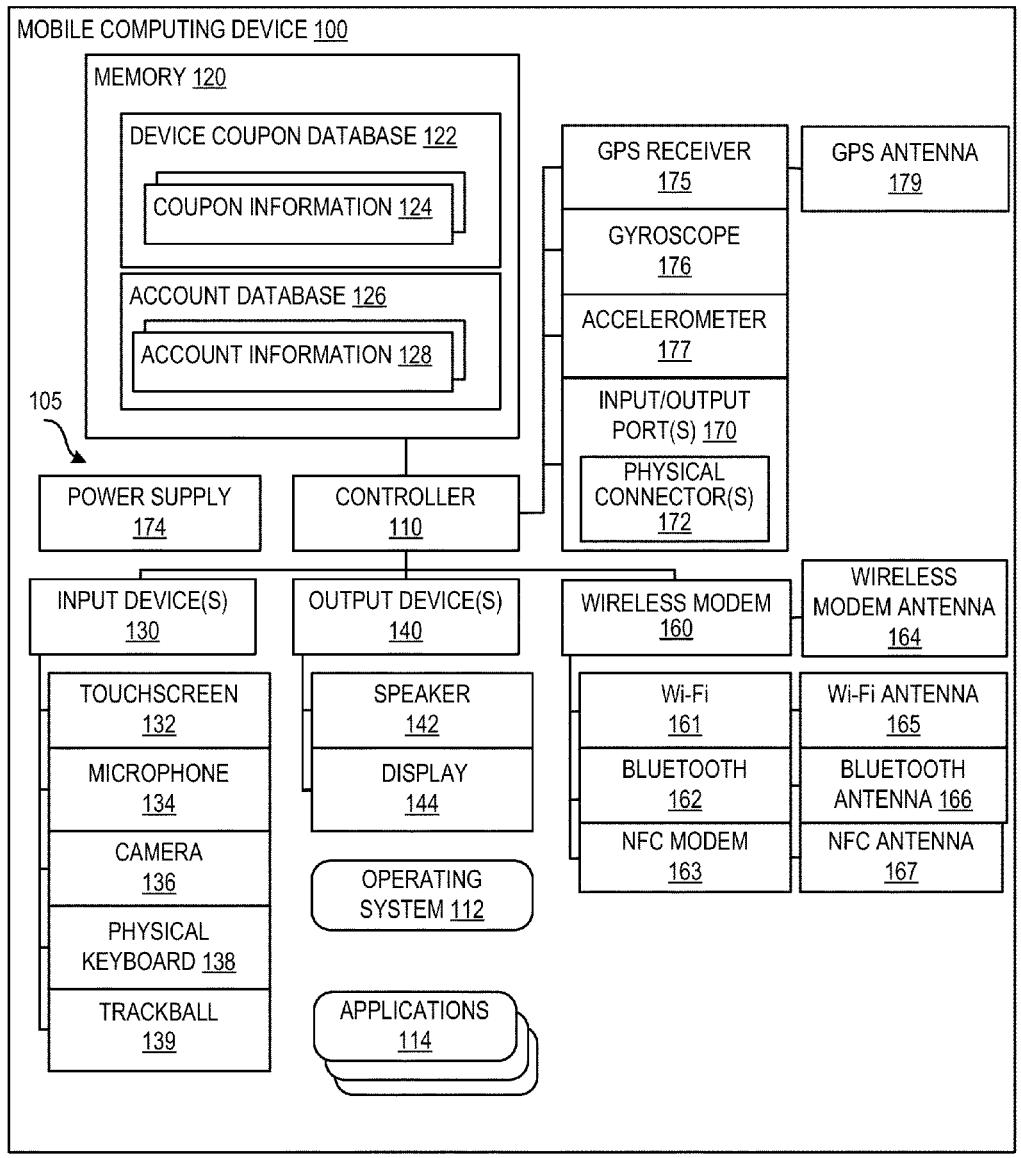
FIG. 1 is a system diagram depicting an exemplary mobile computing device.

FIG. 1 is a system diagram depicting an exemplary mobile computing device (mobile device) 100 that can be used to perform any of the methods described herein. The mobile computing device 100 can include a variety of optional hardware and software components 105. Generally, components 105 can communicate with other components, although not all connections are shown, for ease of illustration. The mobile computing device 100 can be any of a variety of mobile computing devices (e.g., cell phone, smartphone, handheld computer, laptop computer, notebook computer, tablet device, slate device, media player, Personal Digital Assistant (PDA)) and can allow wired or wireless communication with one or more networks, such as a wireless Wi-Fi™, cellular or satellite network.

The mobile computing device 100 can include a controller or processor 110 (e.g., signal processor, graphics processing unit (GPU), microprocessor, ASIC, or other control and processing logic circuitry or software) for performing such tasks as signal coding, graphics processing, data processing, input/output processing, power control, and/or other functions. An operating system 112 can control the allocation and usage of the components 105 and support for one or more application programs 114. The application programs 114 can include common mobile computing applications (e.g., email applications, calendars, contact managers, web browsers, messaging applications, financial application) as well as other computing applications such as applications associated with specific promotions (e.g., a scavenger hunt application), and managing coupon and account information stored at the device.

The mobile computing device 100 can include memory 120. Memory 120 can include non-removable memory and removable memory. The non-removable, or embedded memory, can include RAM, ROM, flash memory, a hard drive, or other well-known memory storage technologies. The removable memory can include flash memory cards (e.g., SD (Secure Digital) cards), memory sticks, Subscriber Identity Module (SIM) cards, or other well-known memory storage technologies, such as "smart cards." The memory 120 can be used for storing data and/or computer-executable instructions for running the operating system 112 and the application programs 114 on the device 100. Example data can include web pages, text, images, sound files, video data, or other data sets to be sent to and/or received from one or more network servers or other devices by the mobile computing device 100 via one or more wired or wireless networks. The memory 120 can comprise a coupon database 122 local to the device (device coupon database) that contains one or more sets of coupon information 124, and an account database 126 that contains account information 128 for one or more accounts. Such identifiers can be transmitted to a network server to identify users and equipment. The computing device 100 can also have access to external memory (not shown) such as external hard drives.

The computing device 100 can support one or more input devices 130, such as a touch screen 132, microphone 134, camera(s) 136, physical keyboard 138 and/or trackball 139 and one or more output devices 140, such as a speaker(s) 142 and a display 144. Other possible output devices (not shown) can include piezoelectric or other haptic output devices. Any of the input devices 130 and output devices 140 can be internal to, external to, or removably attachable with the computing device 100. External input and output devices 130 and 140 can communicate with the computing device 100 via a wired or wireless connection. Some devices can serve more than one input/output function. For example, touchscreen 132 and display 144 can be combined in a single input/output device.

The computing device 100 can provide one or more natural user interfaces (NUIs). For example, the operating system 112 or applications 114 can comprise speech-recognition software as part of a voice user interface that allows a user to operate the device 100 via voice commands. Further, the device 100 can comprise input devices and software that allows a user to interact with the device 100 via a user's spatial gestures. For example, a user's spatial gestures can be detected and interpreted to provide input to a gaming application. In addition, the device can recognize gestures made with the device itself, such as detecting a tap gesture when a device quickly stops and makes a change in direction.

A wireless modem 160 can be coupled to a wireless modem antenna 164 and can support two-way communications between the mobile computing device 100 and external devices. The modem 160 and the antenna 164 are shown generically and can be a wireless cellular modem for communicating with a mobile cellular communication network. The wireless modem 160 can comprise other radio-based modems such as a Wi-Fi™ modem 161, Bluetooth® modem 162 or NFC (Near Field Communication) modem 163, each of which can be coupled to its own antenna (e.g., Wi-Fi™ antenna 165, Bluetooth® antenna 166, NFC antenna 167). Alternatively, multiple modems can share an antenna, or an antenna could be coupled to one of several modems via a switch (not shown). The wireless modem 160 is typically configured for communication with one or more cellular networks, such as a GSM network for data and voice communications within a single cellular network, between cellular networks, or between the mobile computing device and a public switched telephone network (PSTN).

Near Field Communication (NFC) is a standards-based wireless communication technology that allows for radio communication between computing devices in close proximity (typically, no more than a few centimeters) with each other. NFC-enabled devices (NFC devices) can operate in a peer-to-peer mode that provides two-way communication between NFC devices; a reader/writer mode that provides one-way communication between an NFC device and an NFC tag (such as an unpowered Radio Frequency Identification (RFID) chip); or a card emulation mode that allows an NFC device to operate as a contactless smart card (i.e., a card with an embedded integrated circuit), card, such as a contactless smart debit or credit card. An NFC device can read information stored in an NFC tag by powering the NFC tag via radio energy emitted by the NFC device, and receiving stored information from the powered NFC tag.

The mobile computing device 100 can further include at least one input/output port 170 (which can be, for example, a USB port, an IEEE 1394 (FireWire) port, and/or an RS-232 port) comprising physical connectors 172, a power supply 174, a satellite navigation system receiver such as a GPS receiver 175, a gyroscope 176 and an accelerometer 177. The GPS receiver 175 can be coupled to a GPS antenna 179. The illustrated components 105 are not required or all-inclusive, as any components can be deleted and other components can be added. Generally, as used herein, the term "computer" can refer to any computing device (mobile or otherwise) described or mentioned herein. Thus, computer-executable instructions includes instructions that are executable by any computing device.

Figure 2:
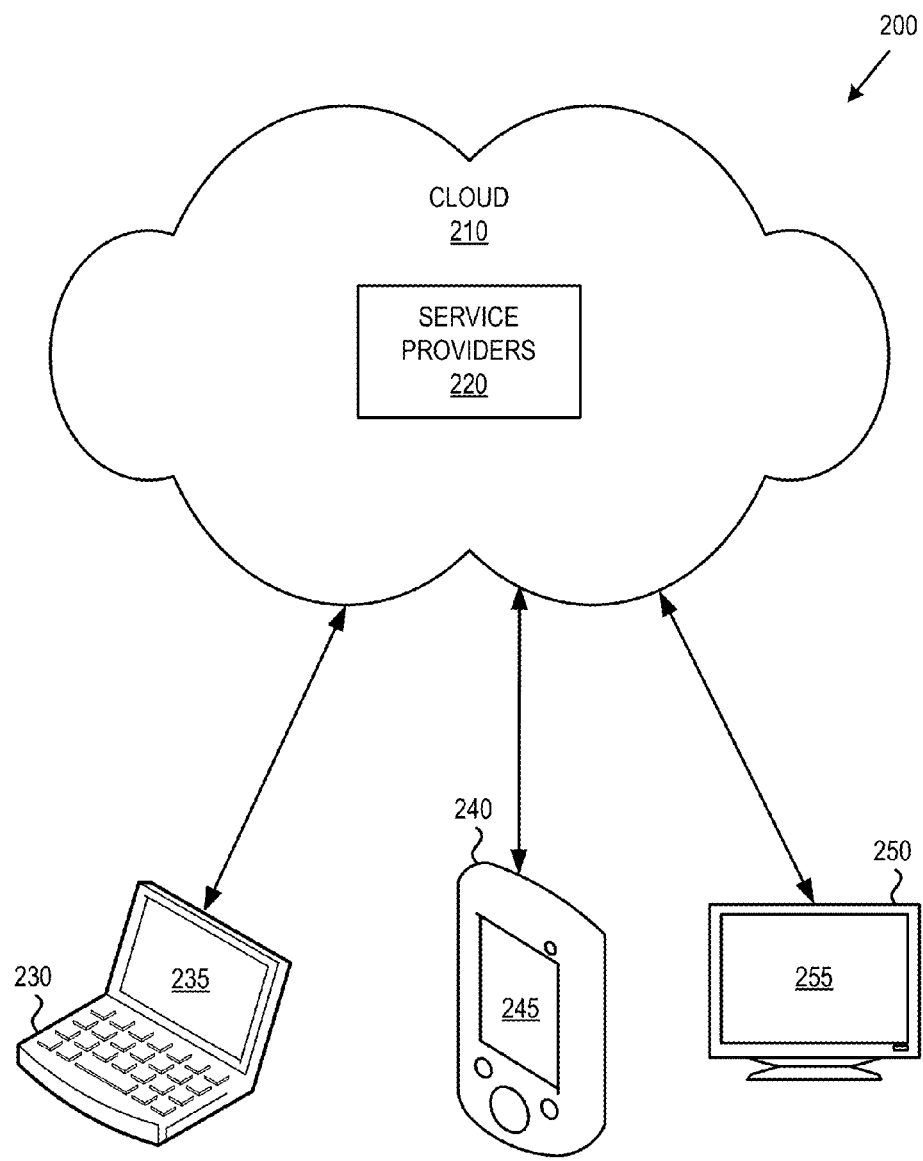
FIG. 2 illustrates a generalized example of a suitable implementation environment in which described embodiments, techniques, and technologies may be implemented.

FIG. 2 illustrates a generalized example of a suitable implementation environment 200 in which described embodiments, techniques, and technologies may be implemented.

In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet, a Local Area Network (LAN) or a Wide Area Network (WAN). The cloud 210 can comprise networks that distribute cable TV media to subscribers. The implementation environment 200 can be used in different ways to accomplish computing tasks. For example, some tasks (e.g., processing user input and presenting a user interface) can be performed on local computing devices (e.g., connected devices 230, 240, 250) while other tasks (e.g., storage of data to be used in subsequent processing, determination of which coupon to send to a receiver) can be performed in the cloud 210.

In example environment 200, the cloud 210 provides services for connected devices 230, 240, 250 with a variety of screen capabilities. Connected device 230 represents a device with a computer screen (e.g., a mid-size screen 235). For example, connected device 230 could be a desktop, laptop, notebook, netbook or tablet computer or the like. Connected device 240 represents a mobile computing device with a mobile computing device screen 245 (e.g., a small-size screen). For example, connected device 240 could be a mobile phone, smart phone, personal digital assistant or the like. Connected device 250 represents a device with a large screen 255. For example, connected device 250 could be a television with Internet connectivity, or a television connected to another device capable of connecting to the cloud such as a cable set-top box, gaming console or the like. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touch screen capability of a particular connected device (e.g., connected devices 230, 240, 250). Services that can be provided by the service providers 220 include, for example, email, Short Message Service (SMS), Multimedia Message Service (MMS), on-demand media streaming, financial services, social networking and website hosting. The service providers can host online marketplaces offering wide varieties of goods and services such as software applications and upgrades and media data that can be obtained by users with or without purchase for download from the cloud 210.

The service providers 220 can provide media for playback at connected devices and coupon information that can be downloaded and stored at connected devices for later use. The service providers 220 can determine whether coupon or account information presented by a connected device at a point of sale terminal can be used for a particular commercial transaction.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

Figure 3:
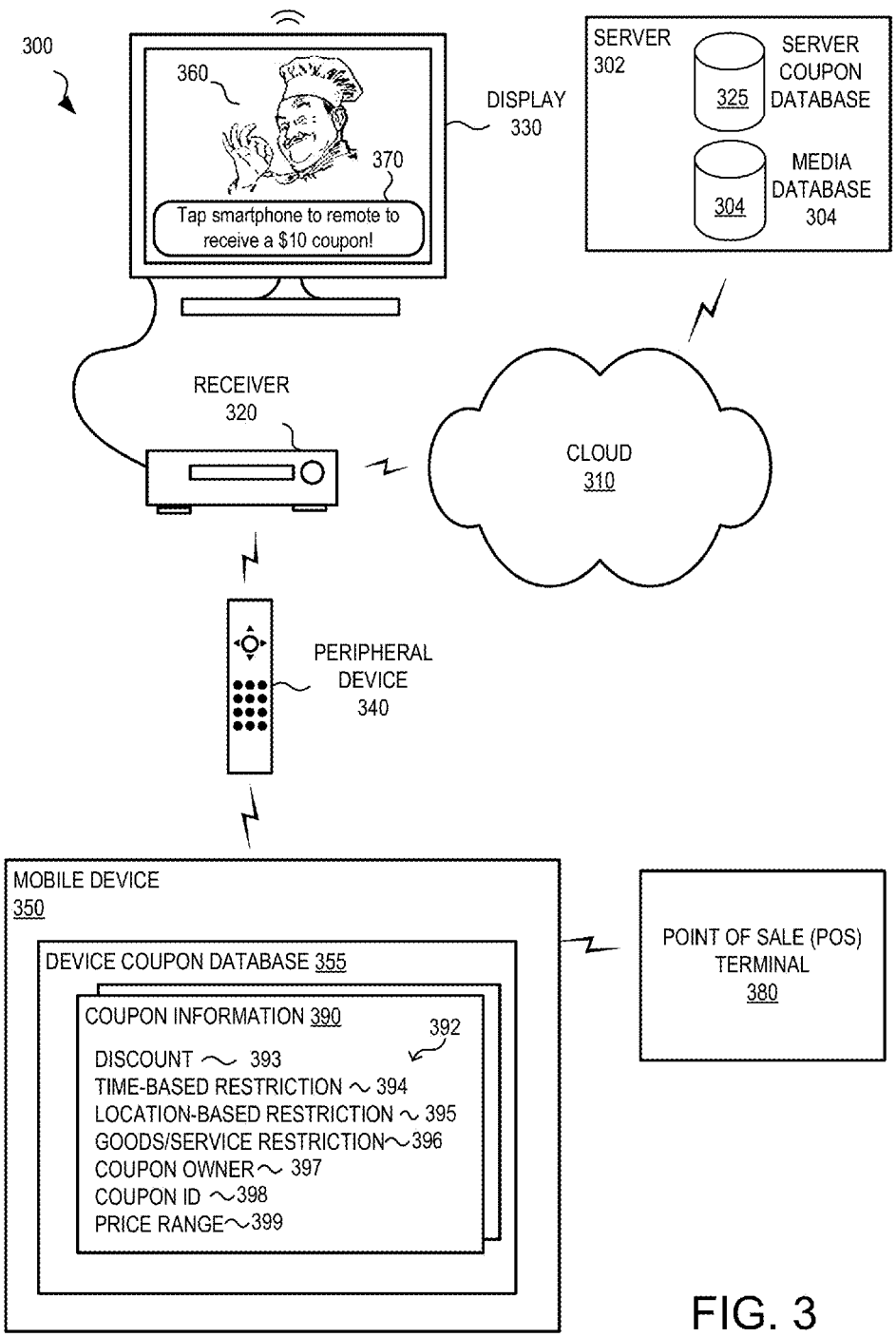
FIG. 3 is a block diagram of a first exemplary system that allows coupons to be collected at a mobile computing device.

FIG. 3 is a block diagram of a first exemplary system 300 that allows coupons to be collected by a mobile computing device 350. Collecting coupons at a mobile computing device can comprise receiving coupon information at the mobile computing device, and can further comprise storing the coupon information in a device coupon database accessible to the mobile computing device.

In general, the terms "coupon" and "coupon information" are used interchangeably and mean information that allows a mobile computing device user to receive a benefit (financial or otherwise) when the coupon information is provided to a business, merchant, service provider or other entity. Such benefits include receiving a discount or rebate, receiving free downloadable content (e.g., free application, book, song, video, recipe or other information) and gaining access to information (e.g., unlocking hidden levels of a software game).

In general, coupon information can be any information that an entity can use to determine whether a mobile device user is entitled to a benefit and characteristics of any benefit. For example, coupon information 390, which is associated with a coupon stored in a device coupon database 355 in mobile computing device 350, includes an exemplary set of coupon data 392. Coupon data 392 comprises discount data 393 indicating, for example, the discount that is to be applied to a purchase when the coupon is redeemed (e.g., 10% off, 20% off, buy-one-get-one-free); time-based restriction data 394, location-based restriction data 395 and goods and services restriction data 396 indicating time-based, location-based, and goods and services restrictions described herein; coupon ID data 398 and price range data 399 indicating, for example, a minimum amount that a user must spend before receiving a discount. The coupon ID data 398 can be a coupon code that a business uses as an index in a business coupon database to determine, for example, whether the coupon has already been used, whether the coupon has expired, whether restrictions specified in the coupon are met, and the benefit to which the user is entitled. Coupon information can contain more or less coupon data than that shown in coupon information 390. Coupon information can also comprise a one-dimension or two-dimensional barcode image (such as a Quick Response code) that is displayed on a mobile computing device display and presented to a barcode reader at a point of sale terminal in order for the coupon to be redeemed.

Other examples of coupon information include time and location information, such as the time or the mobile computing device location when a coupon was collected. Time and location information can be used to determine, for example, what coupon notices the user was watching when a coupon request was made to determine which coupons a user is entitled to receive. Coupon information can comprise other information, such as user account information (e.g., userid, account number) or a URL (Uniform Resources Locator) that directs a user to a business's web page. Additionally, receipt of the coupon information at a mobile computing device can cause an application to be downloaded to the mobile device.

As generally used herein, the term "point of sale terminal" or "POS terminal" refers to hardware and software at a point of sale, point of purchase or checkout involved in commercial transactions. Point of sale terminals include computing devices or systems that are capable of wireless communication with a mobile computing device. Point of sale terminals can be NFC-enabled, Wi-Fi™ enabled, Bluetooth®-enabled or support other wireless or wired communication standards.

System 300 comprises a server 302 that supplies media data from a media database 304 through a cloud 310 to a receiver 320 for playback at a display 330. The server 302 comprises a server coupon database 325 along with the media database 304. The receiver 320 is connected to the cloud 310 and can wirelessly communicate with an NFC-enabled peripheral device 340, which in turn can wirelessly communicate with the mobile device 350. The server 302 can provide video, audio or other media data to the receiver 320 and can be part of a cable TV, Internet or other cloud-based service that delivers media. Alternatively, the server 302 can simply be a web server that distributes media as part of providing web site content.

The receiver 320 can be a cable set-top box, satellite receiver, gaming console, Internet modem, or other device capable of connecting to the cloud 310 and outputting media at the display 330. Audio media can be output at speakers built into the display 330 or other speakers (not shown) connected to the receiver 320. The display 330 can be a television or any other device capable of displaying video media provided by the receiver 320. In some embodiments, the display 330 supports wireless communication (e.g., NFC, Bluetooth®). The peripheral device 340 can be a remote control (such as a cable TV remote controller, game controller or the like), and can communicate with the receiver 320 via a wired or wireless connection. In some embodiments, the peripheral device 340 and the mobile device 350 are NFC devices.

In general, as used herein, the term media refers to both media data provided by the server 302 to the receiver 320 and the resulting media that is output by the receiver based on the media data. Thus, media comprises any data that can be used to generate images, audio, video, audio/video or any other kind of media at an output device such as a television, speakers, mobile computing device output or the like. The media can be stored in various file formats (e.g., .jpg, .tif, .wav, .mp3, .mpeg, .mpeg4) and can be encoded using various codecs or not encoded. Media data can include coupon notice data that can be used to output a coupon notice at an output device.

In an exemplary application of the system 300, a mobile device 350 can collect coupons as follows. The server 302 is part of a cable TV service and provides a television program to the cloud 310 that is received by the receiver 320 and displayed at the display 330. In a representative example, during a commercial break, a commercial 360 for a new restaurant, Little Italy Pizza House, is shown at the display 330. At some point during the commercial, in order to promote the restaurant, a coupon notice 370 (that is, a reference to a coupon) is output at the display 330. In general, a coupon notice can be an audio, video or audio/video notice that indicates that a coupon or promotion is available for retrieval by a computing device. The coupon notice 370 is accompanied by the audio notice 375, "Tap your smartphone to your remote control to receive a coupon for $10 off your first visit to Little Italy Pizza House." As used herein, the term "tap" requires that two NFC devices are brought close enough together to enable NFC communication. A tap does not require that the two NFC devices actually touch. Typically, bringing two NFC devices within a few centimeters apart is sufficient to enable NFC communication.

The receiver 320 sends a signal to the peripheral device 340 that causes the peripheral device 340 to detect the presence of another NFC device when the coupon notice 370 is displayed or for a predetermined time during which the coupon notice 370 may or may not be displayed. Typically, the peripheral device 340 continues to monitor for the presence of another NFC device until a predetermined time after the coupon notice 370 is no longer displayed. The peripheral device 340 can begin and end monitoring for the presence of another device at other times (e.g., begin monitoring once a commercial starts, end monitoring when a coupon notice is no longer displayed). The user of the mobile computing device 350, Miguel, not having heard of Little Italy Pizza House until now, is interested and taps the mobile device 350 to the peripheral device 340 to collect the coupon.

Upon detecting a tap by the mobile device 350 to the peripheral device 340, the peripheral device 340 notifies the receiver 320 of the presence of the mobile device 350. The peripheral device 340 may query the mobile computing device 350 for information that can be used by the receiver 320 (remote server 300, etc.) in determining what coupon information should be delivered to the mobile computing device 350. This information returned by the mobile computing device 350 to such a request can include time information (e.g., the current time), location information (e.g., the present location of the mobile computing device), coupon request information (e.g., information indicating that the mobile computing device is requesting coupon information), mobile computing device information (e.g., network connection, software and/or hardware capabilities of the mobile computing device, product/serial number) and user information (e.g., account numbers for user accounts with a service (cable TV service, Internet service, etc.)), and any other information. The mobile computing device can also deliver information that can be used for delivering coupon information, such as a user's email address or phone number.

The peripheral 340 can send a coupon request to the receiver 320 that includes all or any portion of the information received from the mobile computing device 350 to the receiver 320. In some embodiments, the peripheral device 340 sends a notification that the mobile computing device 350 is requesting coupon information, with no additional data.

In response to receiving a coupon request from the peripheral device 340, the receiver 320 sends the coupon information to the mobile device 350 via the peripheral device 340. The receiver 320 can determine which coupon information to send to the mobile computing device 350, or the receiver can send a coupon request to a remote server, as described below. Once the mobile computing device 350 receives the coupon information, the mobile device 350 stores the coupon information in a device coupon database 355.

A device coupon database can store one or more sets of coupon information (one or more coupons). A device coupon database is stored at a mobile computing device and can be, for example, a data structure or a portion of mobile computing device memory designated for storing coupon information. Typically, a mobile device looks to its locally stored device coupon database for a coupon that can be used for a particular transaction. In various embodiments, coupon information can be stored in mobile device memory outside of a device coupon database 355, such as in a media cache memory that stores coupon information until it is overwritten by overwritten with other coupon information or other data received at the mobile device. Although the device coupon database 355 is shown as part of the mobile device 350, in various embodiments, a device coupon database can be located external to the mobile device 350, such as an external hard drive or in removable memory. In other embodiments, collected coupons are stored in a coupon database stored in the cloud. Coupon information can be passed to a cloud-based coupon database by a mobile computing device, after the mobile computing device has received coupon information, by the receiver upon receiving an indication that a mobile computing device has been tapped to a peripheral device, or a server that has received a coupon information request from a receiver. A cloud-based coupon database can be a user-based coupon database that stores coupon collected by a user at multiple computing devices.

Once the coupon information has been received and stored at the mobile device 350, Miguel receives notification of such at a mobile computing device display. The next day, Miguel goes to Little Italy's Pizza House for dinner and redeems the coupon to receive $10 off his dinner bill. Miguel redeems the coupon by tapping the mobile computing device 350 to an NFC-enabled point of sale terminal 380 in the restaurant, thereby allowing the coupon information (or at least a portion of it) stored in the device coupon database to be communicated to the terminal 380 using NFC technology. If the POS terminal 380 is not NFC-enabled, the coupon information can be transmitted to a POS terminal using another wireless communication technique, such as Bluetooth®.

Coupon information can be redeemed in other fashions. For example, if the coupon information comprises a barcode image, the barcode image can be displayed on a display of the mobile device and presented to a barcode reader at a POS terminal.

A mobile device user's intent to collect a coupon associated with a coupon notice can be indicated in a manner other than the peripheral device 340 monitoring for the presence of another NFC device in response to display of a coupon notice. For example, an NFC communication link can be initiated by the mobile computing device 350 in response to the mobile computing device user requesting coupon information.

For example, in order to receive and store coupon information, the mobile computing device can execute coupon software that allows the device to request coupon information, recognize received information as coupon information, store coupon information in a coupon database, and handle other coupon management tasks. Coupon software can be, for example, a dedicated coupon-related application or a portion of the mobile computing device's operating system. The coupon software can be configured to allow a user to request coupon information for a coupon notice viewed or heard by the user. For example, upon seeing the coupon notice 370, the user can click a "clip coupon" element presented at a touchscreen display of the mobile device by the coupon software to generate a coupon information request. Alternatively, an audio alert, vibration pattern or visual indication other than text (e.g., a blinking LED, display of an icon) indicating that a coupon is available for clipping could be output by the mobile computing device. The coupon request can be sent to the peripheral device 340 via NFC. If there is no peripheral device 340 nearby or the peripheral 340 is not turned on or its battery has died, the request can be sent directly to the receiver 320. The coupon request can also be sent directly to the display 330, if the display 330 is enabled to support wireless communication. If the receiver 320 is located too far from the mobile computing device 350 to enable NFC communication, the coupon information request can be sent to the receiver 320 via Bluetooth®, Wi-Fi™ or other wireless communication technology.

In some embodiments, coupon software can be configured to interpret a mobile computing device gesture to be a coupon request. For example, coupon software can interpret a user waving, shaking, wiggling or moving the device in any other fashion as indicating a desire by the user to collect coupon information. These gestures can be determined at least in part from data generated by an accelerometer and/or gyroscope in the mobile computing device 350.

Coupon information can be collected at the mobile computing device 350 using the system 300 in various scenarios. In a first scenario, coupon information associated with a coupon notice is provided by the server 302 to the receiver 320 along with the media containing the advertisement including the coupon notice. Thus, the receiver 320 has received the coupon information independent of a user indicating a desire to receive coupon information. In response to receiving notification that the mobile device 350 has been tapped to the peripheral device 340, the receiver 320 determines which coupon information to send to the mobile device 350. If one coupon is stored, that coupon information is sent to the mobile device. If more than one coupon is stored, the receiver determines which coupon to send based on, for example, the time when the notification of a tap is received at the receiver 320 and when coupon notices were displayed at the display. For example, the receiver 320 can determine the coupon information associated with the coupon notice 370 is to be sent if notification of a tap is received while the coupon notice 370 is still displayed, until a designated amount of time has passed after the notice 370 is no longer displayed, or until another coupon notice is displayed.

In a second scenario, the coupon information is not delivered with the media containing the associated coupon notice. After receiving notification of a mobile computing device tap, the receiver 320 sends a request for coupon information to the server 302. The request can include a request for coupon information associated with a particular coupon notice (e.g., coupon notice 370), or it can contain a general request for coupon information, leaving it to the server to determine which coupon information to supply in return. The receiver 320 can send all or any portion of the information received from the mobile computing device 350 (either directly or via the peripheral device 340). Information that the server 320 can supply with the request further includes, for example, media and/or coupon notice that are currently playing or were previously played at the display 330, the time that media and/or coupon notices were played. The server 302 can determine which coupon information from the server coupon database 325 to return to the receiver 320 based on, for example, information provided in the coupon information request such as the media or advertisement that was being displayed on the display 330 when the coupon information request was sent, the time that the request was sent and other information. The receiver 320 can determine what coupon information the mobile device user is requesting as well. In this case, the server 302 determines that the mobile device user is requesting coupon information associated with the coupon notice 370 and delivers this information to the receiver 320. The receiver 320 passes the coupon information to the peripheral device 340, which in turn passes it to the mobile device 350 using NFC.

Thus, one exemplary advantage of collecting a coupon at the mobile device 350 using the system 300 according to these first two scenarios is the ability to collect coupons at a mobile computing device with a single gesture—a tapping of a mobile device to a peripheral device.

In a third scenario, the receiver 320 receives coupon information along with the media containing coupon notices, and stores the coupon information locally. The receiver 320 can store coupon information for coupon notices displayed during the most-recently displayed program, within the past hour, day, week, other time period, or until deleted by a user. A mobile device user can then, using, for example, coupon software executing on the mobile device 350, access the coupons stored at the receiver 320, and select one or more coupons to be delivered to the mobile device 350. For example, the receiver 320 can send stored coupons to the device, the list can be presented on a display, and the user can select one or more of coupons for collection. In some embodiments, a user can search stored coupons based on input captured at the mobile computing device. For example, stored coupons can be searched by keywords entered by the user; by image, using an image of a commercial captured by the mobile computing device, or by audio, using an audio clip recorded while a commercial was playing. To enable video or audio searching of coupons, coupon information can contain image or audio data to be compared against image or audio data (or data derived therefrom) captured at a mobile computing device.

In a fourth scenario, the mobile device can access the server 302 to access coupons associated with coupon notices that were displayed in media made available by the server within a specified time period. For example, if the server 302 is operated by a cable TV provider, the mobile device 350 can access coupons shown on any channel that the mobile computing device user subscribes to within the past day, week, etc., and the user can select one or more of these coupons for collection at the mobile computing device 350.

Although the visual coupon notice 370 is discussed with reference to a commercial being displayed as part of a television program, visual coupon notices can be displayed before, after, or during the display of any visual media provided by server 302. Coupon notices can be included in advertisements displayed as part of media streamed from video media web sites such as Netflix®, Hulu® and YouTube®. Audio coupon notices can be presented at display 330 or other audio media playback devices (e.g., speakers connected to receiver 320) as part of audio media provided by audio providers such as Pandora® or other audio streaming websites.

Coupons can be collected at the mobile device 350 using variations of the system 300. For example, the peripheral device 340 may not be involved in communication between the mobile device 350 and the receiver 320. For instance, the receiver 320 can be an NFC device and a coupon can be collected through NFC communication between the mobile device 350 and the receiver 320. The receiver 320 can detect the presence of another NFC device while the coupon notice 370 is displayed, and the receiver 320 can interpret a tap from a mobile computing device 350 to be a request for coupon information associated with the coupon notice 370. In addition, the receiver 320 and the display 330 can be combined into one device, such as an Internet-enabled television. In this case, coupon information could be transmitted to the mobile device from the Internet-enabled television directly to the mobile device 350 via NFC or other short-range radio communication technology. If the display 330 is configured for wireless communication, coupon information can be transmitted to the mobile device 350 directly from the display 330 as well. Further, communication between the mobile device 350 and the peripheral device 340 or receiver 320 can be performed using any wireless radio communication standard other than NFC, such as Bluetooth®, Bluetooth® low energy (BLE), or Wi-Fi™.

Figure 4:
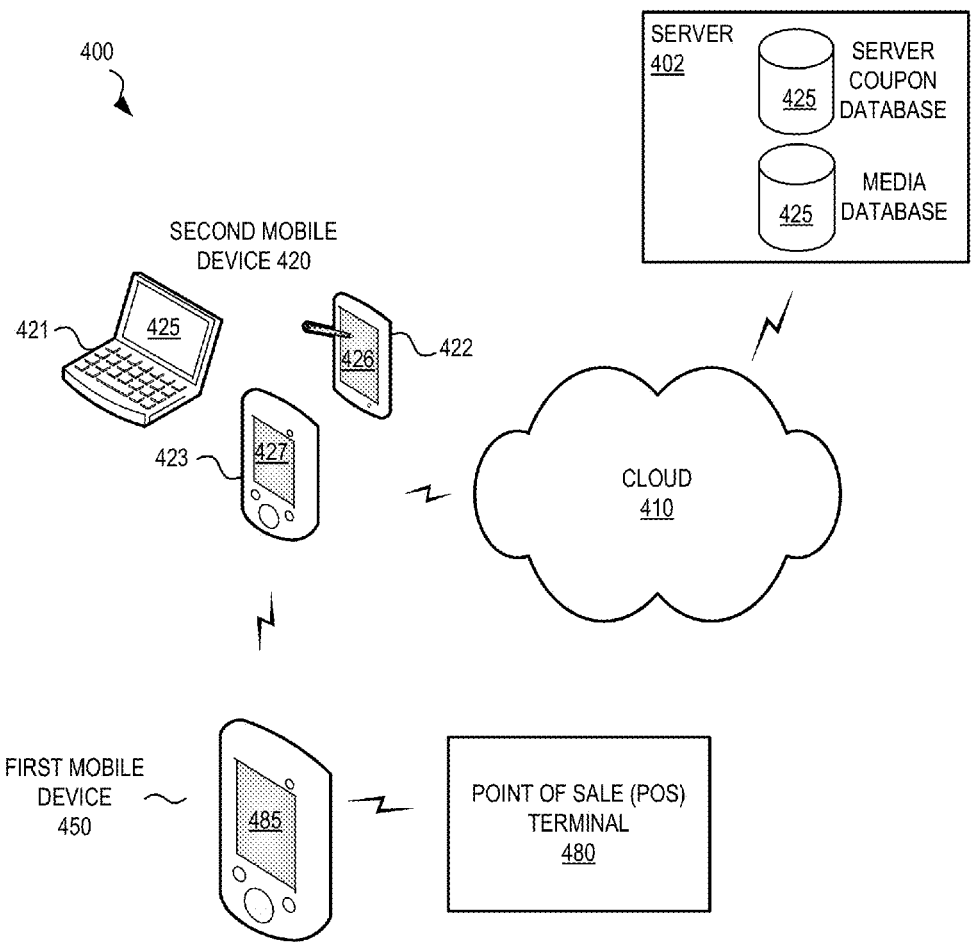
FIG. 4 is a block diagram of a second exemplary system that allows coupons to be collected at a mobile computing device.

FIG. 4 shows a block diagram of a second exemplary system 400 for collecting coupons at a mobile computing device. The system 400 is similar to system 300 but with a second mobile computing device 420 (e.g., laptop computer 421, tablet device 422, smartphone 423) receiving the media data, coupon notice data, and coupon information from the server 402, displaying the received media and the coupon notice on a mobile computing device display (e.g., display 425, 426, 427), and transmitting coupon information to first mobile device 450. The first mobile device 450 is tapped to the second mobile computing device 420 to collect the coupon associated with the coupon notice at the first mobile device 450 for later redemption at a point of sale terminal 460. The first and second mobile computing devices 450 and 420 can be NFC devices and the coupon information can be transmitted from the second mobile device 420 to the first mobile computing device 450 using NFC technology.

Figure 5:
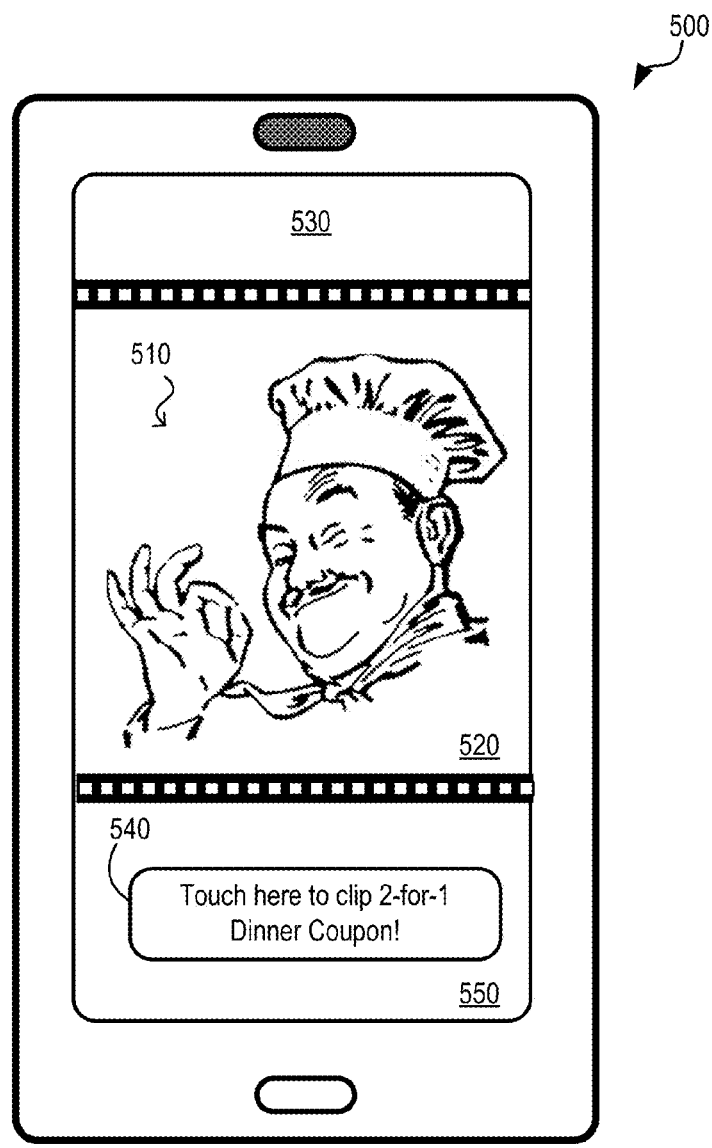
FIG. 5 illustrates a mobile computing device that can collect coupons associated with coupon notices output at the mobile computing device.

FIG. 5 illustrates a mobile computing device 500 that can collect coupons associated with coupon notices output at the mobile computing device 500. The mobile computing device 500 can receive media, coupon notices and coupon information from a cloud-based server. In an example, at some point during playback of a movie provided by a cloud-based on-demand streaming video service at the mobile device 500, a restaurant advertisement 510 is shown in a first portion 520 of the display 530. The restaurant advertisement 510 comprises a tappable coupon notice 540 for a 2-for-1 dinner coupon presented in a second portion 550 of the display 530. If a user touches or taps his finger to the coupon notice 540, coupon information for the 2-for-1 dinner deal is collected at the device 500 and stored in a device coupon database at the device 500. To redeem the coupon, the mobile computing device 500 can transmit at least a portion of the coupon information from the mobile device 500 to a point of sale terminal as part of a commercial transaction.

Collection of coupon information at the device 500 can occur in various manners, including manners similar to the scenarios discussed above in regards to the collection of coupon information at the mobile device 350 in FIG. 3. In a first scenario, the coupon information corresponding to the coupon notice 540 can have been received at the mobile device 500 along with receipt of the media containing the advertisement 500, prior to the user tapping the coupon notice 540. In this case, collecting the coupon information can comprise storing the received coupon information in a device coupon database at the mobile device 500, or in a device coupon database otherwise accessible to the mobile device 500. In some embodiments, the mobile device 500 can be configured to collect coupons automatically. That is, the device 500 can be configured to store coupon information in a device coupon database whenever coupon information is received at the device. Thus, a mobile device user can collect coupons associated with coupon notices displayed at the mobile device without taking any actions to collect the coupons.

In a second scenario, the device 500 can send a request to a server providing the media for coupon information associated with the coupon notice 540. The mobile device 500 receives the coupon information from the server in response to the request and stores the coupon information in a device coupon database. In a third scenario, the user accesses a remote server to access coupon information associated with coupon notices that were displayed within a specified time period (e.g., any coupon notice displayed within the past week on cable TV channels subscribed to by a user).

The coupon notices described herein are not necessarily associated with streaming media. Coupon notices can be tappable (or clickable) elements of any web page that cause a coupon to be collected at a mobile device when tapped. For example, coupon notices can be an actionable image (e.g., a banner ad) or text displayed on a web site on a mobile computing device touchscreen display.

Any of the coupons described herein can be associated with one or more restrictions on how the coupon can be used. For instance, coupon information can comprise one or more location-based restrictions that specify where the coupon can be used. For example, consider Miguel shopping at a mall. After making a purchase at a clothing store, the store provides Miguel with a coupon for $5 off any purchase at the mall's food court by transferring coupon information for the $5 off purchase to his mobile computing device by communication from a POS terminal, an NFC tag, etc. This geographical constraint on the coupon's usage is contained in the received coupon information stored at the device.

Location-based restrictions can be specified as a plurality of geographical coordinates that define a region within which the mobile device (or POS terminal) must be located in order for the coupon to be redeemed. A mobile computing device can determine whether location-based restrictions are satisfied at the time of sale, and if so, allow the coupon information be transmitted to a POS terminal device. The mobile device can check the location-based restrictions against the position of the mobile computing device as indicated by device location data determined by the device itself, or by the location of a POS terminal as indicated by POS terminal location data provided by the POS terminal.

Alternatively, the POS terminal can determine whether the location-based restrictions are satisfied based on information supplied by the mobile device. A mobile device can determine its location based upon data received from a global positioning system (GPS), by triangulation between towers of a cellular network, by reference to physical location of Wi-Fi™ routers in the vicinity, or by another mechanism. Location-based restrictions can specify one or more geographic areas, particular places of business (e.g., business partners or other franchises of the business that dispensed the geo-fenced coupon) and the like.

Coupon usage restrictions can also comprise time-based restrictions. For example, coupon information collected at a mobile device can indicate that the coupon must be used by a specific date (e.g., Aug. 31, 2012, which can include a certain time of day (e.g., 10:00 PM, Aug. 31, 2012)), within an amount of time relative to when the coupon was received at the mobile device (e.g., within 1 hour, within 2 days), by a certain day relative to when the coupon was received (e.g., by the end of the day, by this Friday, by the end of the month), a start time for the coupon (when the coupon may first be used (e.g., a coupon that is only valid on Christmas Day)) or any other time-based restriction. For instance, using his mobile computing device, Miguel "checks in" at the mall with a social networking application (i.e., he supplies the location of his mobile device to a cloud-based server associated with the social network application), and, in response, receives a coupon that offers him 30% off any mall purchase made in the next 30 minutes. Miguel goes to a bookstore, finds a book he wants to buy, and provides the 30% coupon to a bookstore POS terminal via his mobile device when making his purchase. In some embodiments, the mobile device can determine whether the time-based restraint is satisfied before sending the coupon information to the POS device, and in other embodiments, the POS terminal can make this determination. Notification can be provided to the user at a mobile device display whether the coupon was successfully redeemed.

In some embodiments, usage constraints can be associated with other types of information stored at a mobile device, such as financial accounts or other types of accounts. These accounts can be stored in an account database in mobile device memory, such as the account database 126. For example, a mobile device can store information associated with an employee's time punch card account that contains time-based restrictions indicating when the employee must punch in at the start of his shift. If the mobile device is an NFC device, the employee can punch in by tapping his NFC mobile device to an NFC-enabled punch clock at his employer's place of work. Either the user's mobile device or the employer's punch clock can determine whether the user is allowed to punch in, given the location-based restrictions stored on the mobile device. For example, an employee's time punch card account information can indicate that the employee must punch in no later than 9:05 AM to start his shift. If the employee attempts to punch in later than 9:05 AM, the employee may not be allowed to punch in.

In another embodiment, an NFC mobile computing device can emulate a smart card and allow a user to use account information if specified usage conditions are satisfied. The account information can correspond to a financial account, such as a user's bank or credit card account, a transportation account (i.e., information indicating that the user has purchased a monthly bus pass for the month of July), or any other type of account. For example, an account database can contain information indicating that the user has purchased a ski pass at the local ski resort that is valid for the month of January.

Location-based restrictions can restrict usage of a financial account to within a designated geographic area. For example, account information associated with a prepaid credit card account can specify restrictions that restrict use of the card to within a mall, city or certain business. One exemplary application of location-based restrictions to financial accounts stored on mobile devices is parental control over a child's purchases. For instance, a father can provide his daughter with a prepaid credit card account via his mobile device (the father can lend his daughter his device, or provide the financial information to his daughter's mobile device), with the limitation that prepaid credit card can only be used at a specified shopping mall. Restrictions can be configured by a user that has the appropriate authority to do so. For example, the father can select which mall his daughter can use the card, and then, at a later time, reconfigure where his daughter can next use the account to make subsequent purchases.

Another exemplary application of account information comprising location-based restrictions is a device that determines which account information to use for payment depending on the location of the device. For example, a business traveler who travels frequently can have account information stored in his mobile device account database for various transportation systems such as the BART (Bay Area Rapid Transit) system in San Francisco. Transportation system accounts can include location-based restrictions that allow the mobile device to use the appropriate account information when the mobile device receives a payment request from a transportation system. For example, account information for the BART system can specify that the BART account information be presented in response to a payment request when the device is in California, within 50 miles of San Francisco's city center, or within a specified geographic region that includes BART stations. Transportation system-related account information can contain further usage restrictions such as limiting the account to be used for particular transportation modalities such as ferry, bus or light rail.

Usage restrictions can comprise additional types of restrictions. Goods or services restrictions can restrict the goods or services for which a coupon or account can be used. For example, in the father/daughter shopping example, the father can further limit use of the prepaid credit card by adding the constraint that the card can only be used to purchase certain types of goods (e.g., clothes, school supplies) or a specific product (e.g., a Windows® Phone). Another type of restriction is a store restriction that restricts coupon or account usage to one or more particular stores. Store restriction can be implemented, for example, as store identifiers, geographical coordinates of stores, store addresses or any other information that can be used to identify a store. For example, coupon information for a free coffee at a national coffee chain can contain a store restriction that the coupon can only be used at store number 3458, the coffee chain's store in Times Square in New York.

In another embodiment of wireless communication-enabled promotions, a promotion can require that a user collect information from NFC tags affixed to specified items to unlock a coupon, recipe, game add-ons (e.g., additional levels, weapons, armor, spells, avatar accessories), book chapters, ringtones, songs, movie trailers, or any other additional information or promotion. Consider the example where Miguel's favorite chef is promoting a scavenger hunt in partnership with a grocery store chain in which a participant can receive a copy of the chef's secret Shepherd's pie recipe if he or she collects all of the items in the scavenger hunt list. Miguel goes to a local branch of the participating grocery chain, and "collects" the items in the scavenger hunt list by tapping his NFC mobile device to an NFC tag affixed to the items in the list. Once the mobile device determines that Miguel has collected information for all of the items on the scavenger list (which could be performed by a scavenger hunt list application downloaded from the chef's or the grocery store's web site), the device notifies a remote server, and Miguel receives the secret recipe at his mobile device. In another example of a promotion requiring a user to "collect" items as part of a promotion, a user can collect various items throughout neighborhood stores by tapping his or her NFC mobile device to NFC tags in order to unlock free electronic books being offered by a bookstore.

NFC-enabled mobile computing devices can also be used to enable scavenger hunt competitions in which individuals or teams are given a list of items to find within a store, a mall, a city, etc. The items can be collected by NFC mobile devices reading information stored on an item's NFC tag. A scavenger hunt-related application at one or more mobile devices can keep track of each team's progress such as how long it took to collect each item. Information retrieved from an NFC tag can provide clues for finding the next items, which action the team is to take next, or other information. The mobile device can wirelessly connect with a remote server to allow for real-time monitoring of the teams' progress.

Time-based or location-based restrictions can apply to any unlocked information. For example, coupons collected as the result of collecting all items in a scavenger hunt list can comprise time-based or geographical-constraints. For instance, a restaurant chain promotion promoting a burger-and-fries deal can provide a user with a coupon for 50% off the burger and fries combination if the user locates certain items hidden in the restaurant. If the user collects the items with his mobile device, coupon information for the 50% coupon is received and contains the time-based restriction that the coupon must be used within 10 minutes of receipt.

Figure 6A:
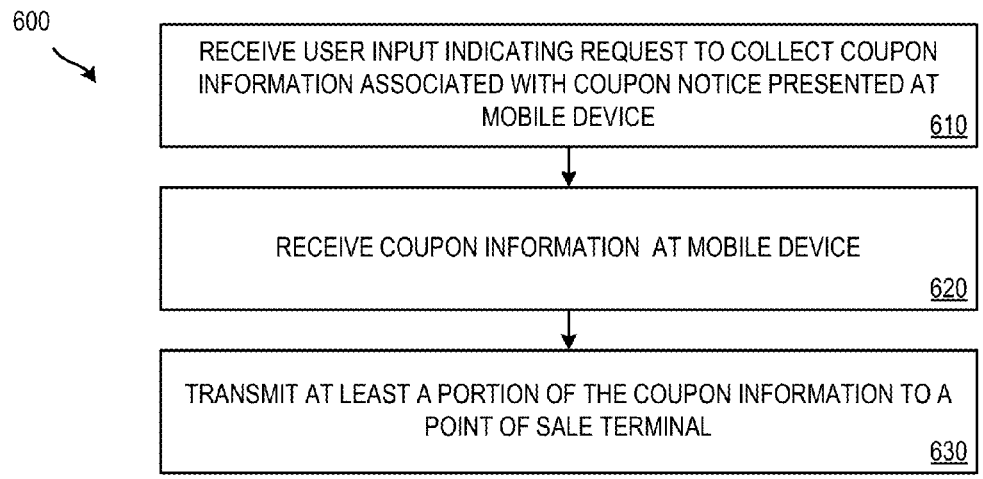
FIG. 6(a) is a flowchart of an exemplary method of collecting a coupon at a mobile computing device.

FIG. 6(a) is a flowchart of an exemplary method 600 of collecting a coupon at a mobile computing device. The method 600 can be performed by an NFC-enabled smartphone. At 610, user input is received at the mobile computing device indicating a request to collect coupon information associated with the coupon notice presented by the mobile computing device. In the example, the smartphone user taps the coupon notice to indicate a request to collect coupon information associated with the bookstore coupon notice at the smartphone. At 620, the coupon information is received at the mobile computing device. In the example, coupon information associated with the 20% off bookstore coupon is received at the smartphone. At 630, at least a portion of the coupon information is transmitted from the mobile computing device to a point of sale terminal. In the example, the smartphone user goes to a local branch of the bookstore chain, finds a book he likes, and transmits a portion of the 20% off bookstore coupon information stored in his smartphone to a point of sale terminal in the bookstore, as part of purchasing the book.

Figure 6B:
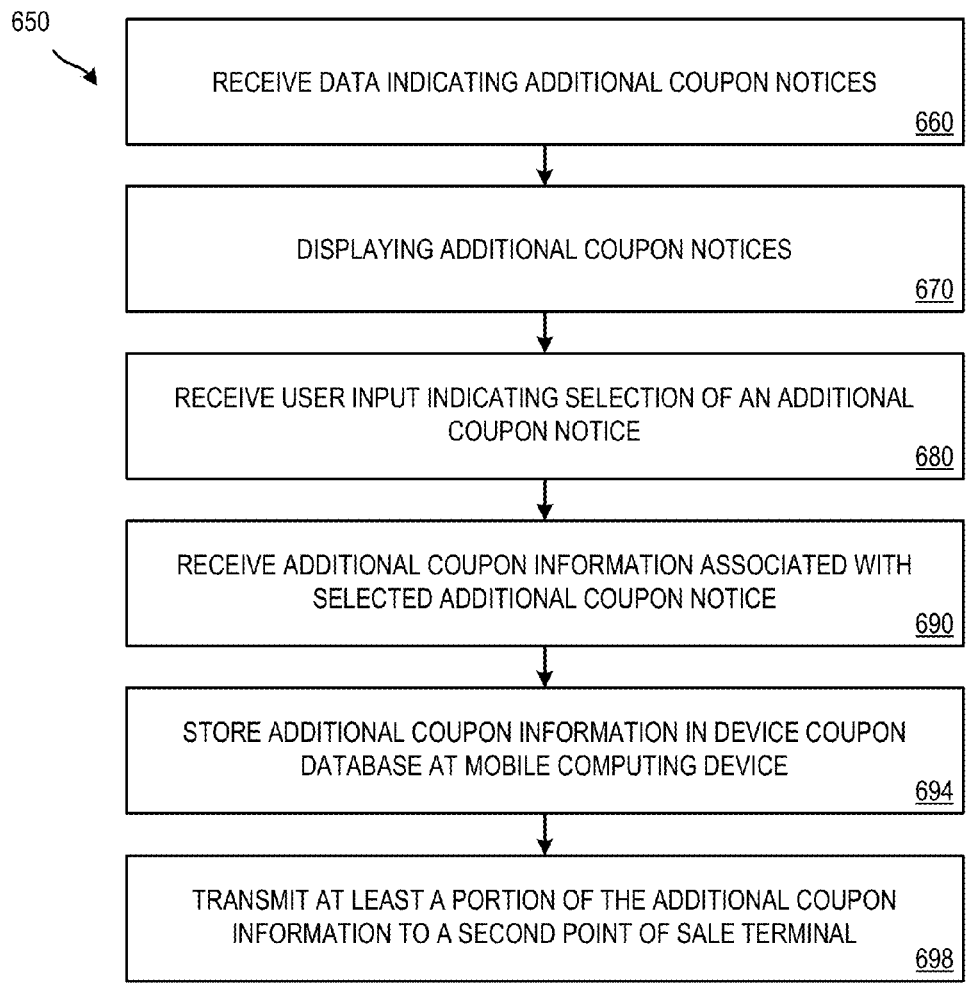
FIG. 6(b) is a flowchart of additional actions that can be performed as part of the exemplary method of collecting coupons at a mobile computing device.

FIG. 6(b) is a flowchart of additional actions 650 that can be performed as part of the exemplary method 600 for collecting coupons at a mobile computing device. At 660, data associated with a plurality of additional coupon notices is received. In the example, the smartphone user receives data associated with a plurality of additional coupon notices that have been displayed at the smartphone over the past month. At 670, the plurality of additional coupon notices is displayed at a display of the mobile computing device. In the example, the plurality of coupon notices is displayed at the smartphone display. At 680, user input indicating selection of at least one of the additional coupon notices is received. In the example, the smartphone receives user input indicating that the user has selected a coupon for 30% off any purchase at a men's clothing store that was displayed during a movie he watched on his smartphone earlier that week.

At 690, additional coupon information associated with the at least one selected additional coupon notice is received. In the example, coupon information associated with the 30% off coupon is received. At 694, the additional coupon information is stored in a coupon database at the mobile computing device. In the example, the 30% off men's clothing store coupon information is stored in a coupon database at the smartphone. At 698, at least a portion of the additional coupon information is transmitted from the mobile computing device to a second point of sale terminal. In the example, at least a portion of the 30% off men's clothing store coupon is transmitted to a point of sale terminal at the men's clothing store as part of the smartphone user buying shirts at the store.

Figure 7:
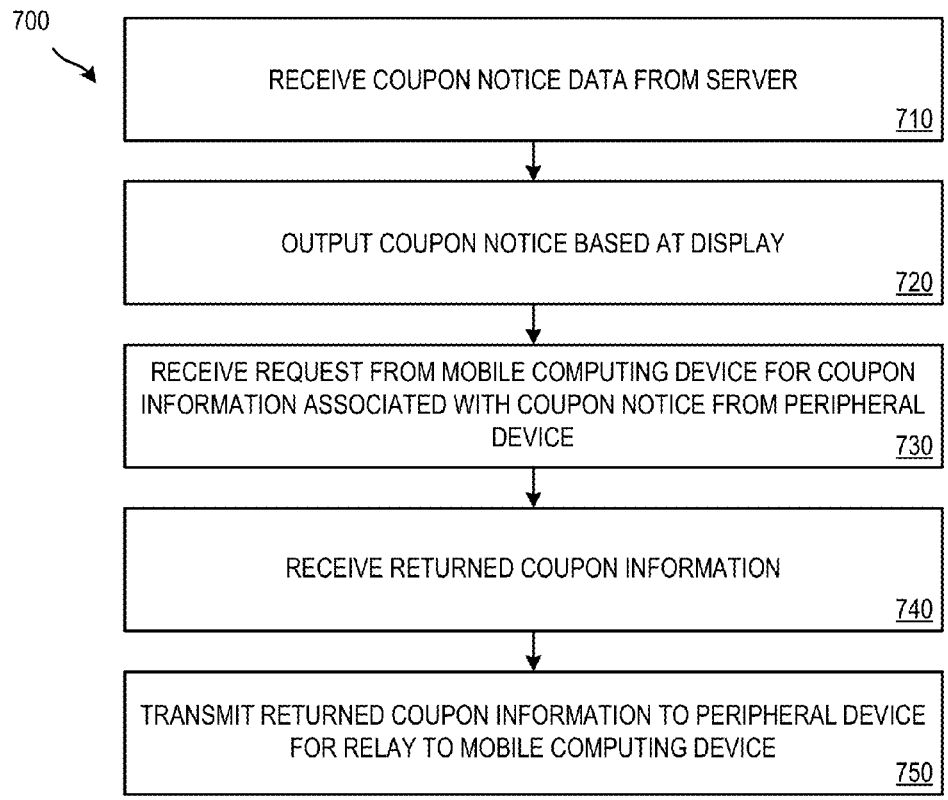
FIG. 7 is a flowchart of an exemplary method of requesting and receiving coupon information for a mobile computing device

FIG. 7 is a flowchart of an exemplary method 700 of requesting and receiving coupon information for a mobile computing device. The method can be performed by, for example, an Xbox® gaming console. At 710, a receiver receives coupon notice data from a remote server. In the example, the Xbox® gaming console receives coupon notice data as part of media data streamed from an on-demand cloud-based video service such as the Netflix® video streaming service. At 720, a coupon notice based on the coupon notice data is output at a display. In the example, a coupon notice for 50% off an Xbox® video game is output at a television connected to the gaming console. At 730, a request from a mobile computing device for coupon information associated with the coupon notice is received via wireless communication from a peripheral device. In the example, the Xbox® gaming console receives a request from a smartphone to receive coupon information associated with the video game coupon. The request is received via wireless communication from an Xbox® video game controller. At 740, returned coupon information is received at the receiver. In the example, the Xbox® gaming console receives coupon information for the video game coupon. At 750, the returned coupon information is transmitted via wireless communication to the peripheral device for relay to the mobile computing device. In the example, the video game coupon information is transmitted wirelessly to the Xbox® game controller for relay to the smartphone.

Figure 8:
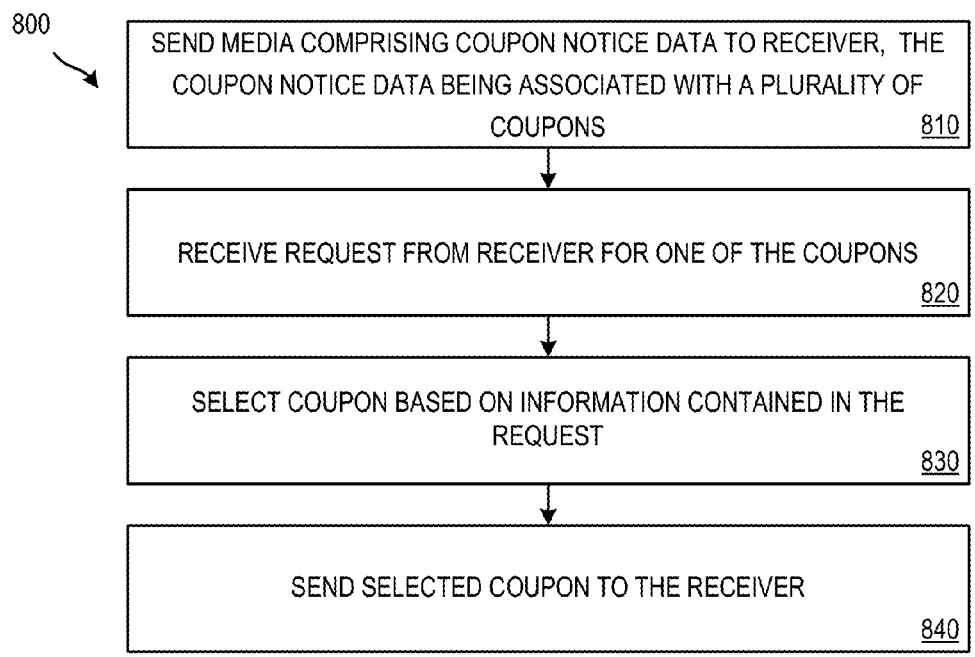
FIG. 8 is a flowchart of an exemplary method of determining a coupon to send to a receiver.

FIG. 8 is a flowchart of an exemplary method 800 of determining a coupon to send to a receiver. The exemplary method 800 can be performed by, for example, a cable TV server that distributes video media to subscribers. At 810, media data comprising coupon notice data is sent to a remote receiver. The media contains a plurality of video programs and the coupon notice data is associated with a plurality of coupons, each coupon notice being associated with one of the video programs. In the example, the cable TV server provides media containing multiple television programs. The media comprises coupon notice data associated with a plurality of coupons, each coupon notice being associated with one of the television programs. At 820, a request is received from the remote receiver for one or more of the plurality of coupons. In the example, the cable TV server receives a request for a coupon associated with one of the coupon notices. At 830, a selected coupon is selected from the plurality of coupons to send to the remote receiver based on information contained in the request. In the example, the cable TV server selects the coupon that was being played by the remote receiver at the time the coupon request was sent to the cable TV server, and information that was contained in the coupon request. At 840, the selected coupon is sent to the remote receiver. In the example, the coupon associated with the coupon notice that was playing when the coupon request was made is sent to the remote receiver.

Any of the disclosed methods can be implemented as computer-executable instructions or a computer program product. The computer-executable instructions or computer program products as well as any data created and used during implementation of the disclosed embodiments can be stored on one or more computer-readable storage media (e.g., non-transitory computer-readable media, such as one or more optical media discs (e.g., CDs or DVDs), volatile memory components (such as DRAM or SRAM), or non-volatile memory components (such as flash memory or hard drives)) and executed on any computer device. Computer-readable storage media does not include propagated or propagating signals. The computer-executable instructions can be part of, for example, a computer operating system, a dedicated software application, a software application that is accessed or downloaded via a web browser, or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it is to be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Having illustrated and described the principles of the illustrated embodiments, the embodiments can be modified in various arrangements while remaining faithful to the concepts described above. In view of the many possible embodiments to which the principles of the illustrated embodiments may be applied, it should be recognized that the illustrated embodiments are only examples and should not be taken as limiting the scope of the disclosure. We claim all that comes within the scope of the appended claims.

We claim:

1. A method, comprising:

receiving user input at a mobile computing device, the user input indicating a request to collect coupon information that is associated with a coupon notice presented by the mobile computing device, the coupon notice being an indication that a coupon or promotion associated with a commercial entity is available for collection or retrieval by the mobile computing device, the coupon notice being presented on a display of the mobile computing device or in an audio format for playback by the mobile computing device, and the coupon notice identifying the coupon or promotion offered as a benefit when the coupon or promotion is provided to the commercial entity;

in response to the user input associated with the coupon notice presented by the mobile computing device, receiving the requested coupon information at the mobile computing device, the coupon information including additional information related to the coupon or promotion that allows a user of the mobile computing device to receive the benefit when the coupon information is provided to the commercial entity;

altering the coupon or promotion by restricting usage of the coupon or promotion based on one or more usage restrictions configured at least in part by the user input, after the coupon information has been received at the mobile computing device; and transmitting via a wireless communication, the coupon information from the mobile computing device to a point of sale terminal associated with the commercial entity, while the mobile computing device is in a proximity of the point of sale terminal, in order for the user to receive the benefit as restricted by the one or more usage restrictions from the commercial entity after the coupon information is transmitted to the point of sale terminal, while the mobile computing device and the point of sale terminal are both at a location of the commercial entity.

2. The method of claim 1, wherein the receiving the coupon information is responsive to the receiving user input at the mobile computing device indicating a request to collect the coupon information.

3. The method of claim 1, wherein the receiving the coupon information occurs before the receiving user input at the mobile computing device indicating a request to collect the coupon information.

4. The method of claim 1, further comprising storing the coupon information at the mobile computing device in a device coupon database.

5. The method of claim 1, wherein the one or more usage restrictions are indicated in the received additional information.

6. The method of claim 5, wherein the transmitting the coupon information occurs if the one or more usage restrictions are satisfied.

7. The method of claim 5, wherein the one or more usage restrictions comprises a location-based restriction.

8. The method of claim 7, wherein the location-based restriction comprises a plurality of geographical coordinates defining one or more geographical regions.

9. The method of claim 5, wherein the one or more usage restrictions comprises a time-based restriction.

10. The method of claim 9, wherein the time-based restriction indicates that the coupon information is redeemable within a predetermined time period.

11. The method of claim 10, wherein the predetermined time period begins upon receipt of the coupon information at the mobile computing device.

12. The method of claim 5, wherein the one or more usage restrictions comprises a goods or services restriction identifying the goods or services for which the coupon or promotion can be used.

13. The method of claim 5, further comprising determining whether the one or more usage restrictions are satisfied.

14. The method of claim 1, further comprising:
receiving data associated with a plurality of additional coupon notices;
displaying the plurality of additional coupon notices at a display of the mobile computing device;
receiving user input indicating selection of at least one of the additional coupon notices; and
receiving additional coupon information associated with the at least one selected additional coupon notice.

15. The method of claim 14, further comprising:
storing the additional coupon information in a device coupon database at the mobile computing device; and
transmitting the additional coupon information from the mobile computing device to a second point of sale terminal.

16. The method of claim 14, wherein the plurality of additional coupon notices comprises coupon notices previously output at the media computing device.

17. The method of claim 1, wherein the mobile computing device is NFC-enabled, and the transmitting the coupon information to the mobile computing device is performed using NFC technology.

18. A mobile computing device comprising:
a processor;
a display;
one or more input devices;
a memory storing computer-executable instructions for causing the mobile computing device to carry out a method, the method comprising:
receiving user input via the one or more input devices, the user input indicating a request to collect coupon information that is associated with a coupon notice presented by the mobile computing device via the display, the coupon notice being an indication that a coupon or promotion associated with a commercial entity is available for collection or retrieval by the mobile computing device, the coupon notice being presented on a display of the mobile computing device or in an audio format for playback by the mobile computing device, and the coupon notice identifying the coupon offered as a benefit when the coupon is provided to the commercial entity;
in response to the user input, retrieving the requested coupon information at the mobile computing device, the coupon information including additional information related to the coupon or promotion that allows a user of the mobile computing device to receive the benefit when the coupon information is provided to the commercial entity;
altering the coupon or promotion by restricting usage of the coupon or promotion based on one or more usage restrictions indicated by the user input, prior to the user receiving the benefit associated with the coupon; and
transmitting via a wireless communication, the coupon information from the mobile computing device to a point of sale terminal associated with the commercial entity, while the mobile computing device is in a proximity of the point of sale terminal, to allow the user to receive the benefit from the commercial entity after the coupon information is wirelessly transmitted to the point of sale terminal, while the mobile computing device and the point of sale terminal are both at a geographic location of the commercial entity.

19. The mobile device of claim 18, wherein the mobile computing device is NFC-enabled, and the receiving the coupon information at the mobile computing device is performed using NFC.

20. One or more computer-readable storage media storing computer-executable instructions for enabling a mobile computing device to perform a method comprising:
receiving user input at the mobile computing device, the user input indicating a request to collect coupon information that is associated with a coupon notice presented by the mobile computing device, the coupon notice being an indication that a coupon or promotion associated with a commercial entity is available for collection or retrieval by the mobile computing device, the coupon notice being presented on a display of the mobile computing device or in an audio format for playback by the mobile computing device, and the coupon notice identifying the coupon or promotion offered as a benefit when the coupon or promotion is provided to the commercial entity;
in response to the input, receiving the requested coupon information for storage at the mobile computing device, the coupon information including additional information related to the coupon notice that allows a user of the mobile computing device to receive the benefit when the coupon information is provided to the commercial entity;
altering the coupon or promotion by restricting usage of the coupon or promotion based on one or more usage restrictions specified at least in part by the user input; and
transmitting via a wireless communication, the coupon information from the mobile computing device to a point of sale terminal associated with the commercial entity, while the mobile computing device is in a proximity of the point of sale terminal, in order for the user to receive the benefit from the commercial entity after the coupon information is transmitted to the point of sale terminal, while the mobile computing device and the point of sale terminal are both proximately located at a geographic location of the commercial entity.

\* \* \* \* \*